UNITED STATES PATENT OFFICE.

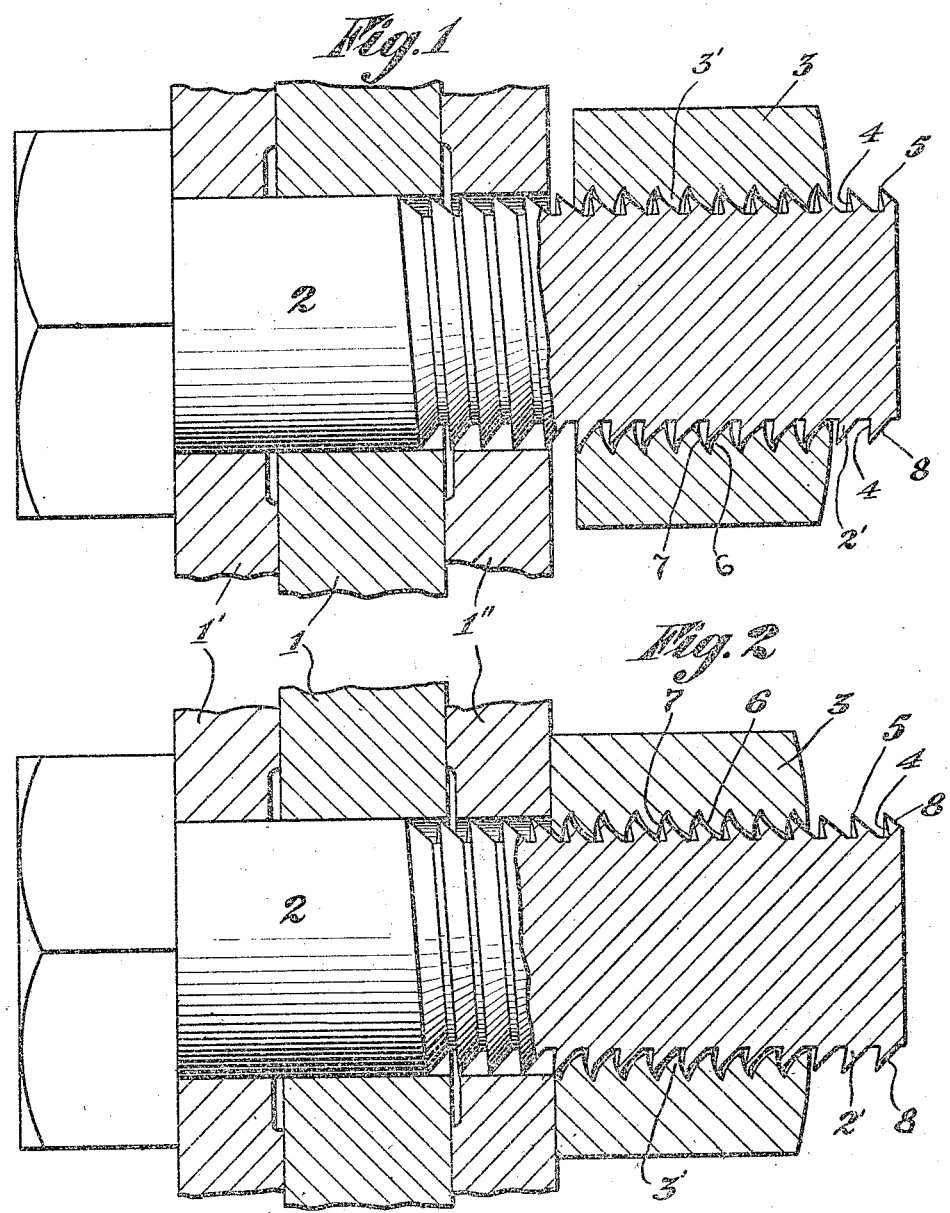

MELCHIOR C. ULRICH, OF SEATTLE, WASHINGTON, ASSIGNOR OF SIXTEEN ONE-HUNDREDTHS TO GEORGE E. DUNN AND THIRTY-THREE ONE-HUNDREDTHS TO GEORGE W. KORTE, OF SEATTLE, WASHINGTON.

NUT-LOCK.

1,075,310.  Specification of Letters Patent.  Patented Oct. 7, 1913.

Application filed April 22, 1913.  Serial No. 762,861.

*To all whom it may concern:*

Be it known that I, MELCHIOR C. ULRICH, a citizen of the United States of America, and a resident of the city of Seattle, in the county of King and State of Washington, have invented certain new and useful Improvements in Nut-Locks, of which the following is a specification.

My invention relates to nut locks and it has for its primary aim to provide a novel construction whereby the nut and bolt elements may be efficiently and securely locked from independent movement.

Other objects will appear as my description progresses, and those features of construction, arrangement and combination of parts on which I desire protection, succinctly defined in my annexed claims.

Referring to the accompanying drawing wherein like characters of reference indicate like parts throughout: Figure 1 is a view of a nut and bolt embodying my invention, the two elements being in unlocked relation. Fig. 2 is a similar view in which the elements are locked, and Fig. 3 is an enlarged fragmentary section illustrating the threads in locked relation.

In the drawing, the members 1, 1' and 1" are being shown clamped or secured together by bolt 2 and nut 3. The latter embody my invention, which is such that when the nut 3 is limited in its advancing movement by engaging with member 1", an extra wrench or turn of said nut will distort the interlocking threads sufficiently to prevent independent movement between the bolt and nut.

The thread 2' of bolt 2 has its face, adjacent the bolt's head, cut out or under cut, as at 4, to provide a bendable or yieldable point 5. The thread 3' of nut 3 is provided with convex and concave faces 6 and 7, respectively, the latter being arranged in advance of under-cut face 4 of bolt thread 2' and engaged by the thread point 5, while the convex face 6 engages the face 8 of said thread 2'.

The nut is applied to the bolt in the usual manner and when the former has reached its limit of movement, determined by member 1", the nut is locked on said bolt by an extra wrench or turn, which will cause point 5 to ride down face 7 toward the base of thread 3'. Such riding of point 5 will bend or distort the thread point to lessen the bearing surface between faces 8 and 6 and present a bearing surface on face 4 for the concave face 7, as shown in Fig. 3. The additionally provided friction between the bolt and nut will lock the two together for all practical purposes and necessitate a greatly increased amount of energy to remove the nut.

The bolt and nut may be used many times or until the face 4 has practically assumed the curve of face 7. In utilizing my invention to unite parts subject to vibration, the nut will grip the bolt more securely due to the under-cut, as the friction between the bolt and nut is accordingly increased with the bearing surface of face 4 the latter being enlarged through the further bending of point 5.

Having thus described my invention, what I claim as new, and desire to secure by Letters Patent of the United States of America, is:—

1. In a device of the character described, a threaded bolt member, and a threaded nut member, the point only of the thread of one of said members normally engaging the thread of the other member and adapted to bent to bring a portion of its threaded face in contact with the thread of the last mentioned member.

2. In a device of the character described, a threaded bolt member, and a threaded nut member, the point only of the thread of one of said members normally engaging the side face of the thread of the other member.

3. In a device of the character described, a threaded bolt, and a threaded nut therefor, the thread of one of the aforesaid elements being provided with a concaved face arranged in advance and a convex face in rear of the thread of the other of said elements.

4. In a device of the character described, a threaded bolt element, and a threaded nut element therefor, the thread of one of the aforesaid elements being adapted to present a greater bearing surface for the interlocking thread of the other of said elements when the latter are restrained from advancing toward one another.

Signed at Seattle, Washington this 14th day of April 1913.

MELCHIOR C. ULRICH.

Witnesses:
E. ARLITA ADAMS
CLARA A. HARM.